(12) United States Patent
Rèbillard et al.

(10) Patent No.: US 12,272,936 B2
(45) Date of Patent: Apr. 8, 2025

(54) METHOD OF JOINTING A POWER CABLE

(71) Applicant: NKT HV Cables AB, Lyckeby (SE)

(72) Inventors: Eric Rèbillard, Karlskrona (SE);
Helena Johansson, Sturkö (SE);
Tommy Johansson, Bräkne-Hoby (SE)

(73) Assignee: NKT HV Cables AB, Lyckeby (SE)

( * ) Notice: Subject to any disclaimer, the term of this patent is extended or adjusted under 35 U.S.C. 154(b) by 180 days.

(21) Appl. No.: 17/936,912

(22) Filed: Sep. 30, 2022

(65) Prior Publication Data
US 2023/0095271 A1  Mar. 30, 2023

(30) Foreign Application Priority Data
Sep. 30, 2021 (EP) .................................... 21200248

(51) Int. Cl.
*H02G 1/14* (2006.01)
*H01R 4/70* (2006.01)
*H02G 15/08* (2006.01)

(52) U.S. Cl.
CPC ................. *H02G 1/14* (2013.01); *H01R 4/70* (2013.01); *H02G 15/08* (2013.01)

(58) Field of Classification Search
USPC ......................................................... 156/49
See application file for complete search history.

(56) References Cited

U.S. PATENT DOCUMENTS

2014/0182886 A1  7/2014  Sonerud et al.
2018/0287354 A1* 10/2018  Ghorbani ............... H02G 15/18

FOREIGN PATENT DOCUMENTS

EP   3381040 A1   10/2018
EP   3633688 A1    4/2020
WO  2015197686 A1  12/2015

OTHER PUBLICATIONS

Extended European Search Report; Application No. 21200248.9; Completed: Feb. 25, 2022; Issued: Mar. 9, 2022; 8 Pages.

* cited by examiner

*Primary Examiner* — Barbara J Musser
(74) *Attorney, Agent, or Firm* — Whitmyer IP Group LLC

(57) ABSTRACT

A method of building a joint insulation of a power cable joint including a conductor joint connecting a first conductor of a first cable length to a second conductor of second cable length, the method including: a) winding a first electrically insulating tape around an inner semiconducting layer that covers the conductor joint so that the first electrically insulating tape connects a first cable length insulation layer of the first cable length to a second cable length insulation layer of the second cable length, to form an inner insulation layer of the joint insulation, and b) winding a second electrically insulating tape around the inner insulation layer, so that the second electrically insulating tape connects the first cable length insulation layer to the second cable length insulation layer, to form an outer insulation layer of the joint insulation, wherein the first electrically insulating tape has a higher peroxide content than the second electrically insulating tape, and c) crosslinking the joint insulation.

15 Claims, 2 Drawing Sheets

METHOD OF JOINTING A POWER CABLE

TECHNICAL FIELD

The present disclosure generally relates to power cable jointing.

BACKGROUND

During power cable manufacturing, it may be necessary to joint two cable lengths. This may for example be as a result of limitations on the maximum continuous cable length that can be produced in the factory, or because of unintended cable cuts.

When two cable lengths are joined in the factory, all the cable layers are removed down to the conductors at the cable ends. The conductor ends are then joined, for example by welding, thus forming a conductor joint. The insulation system around the conductor joint is then rebuilt layer by layer. This is usually done by winding tape layer by layer. The insulation systems of the two cable ends are connected to the joint insulation system. Before the rebuilding process commences, the insulation system of the cable ends may be pencilled, i.e., shaped conically tapering towards the conductor joint.

A pressure resistant heating device can be used for cross-linking the tape layers of the joint insulation system. The joint insulation system is in this case placed inside the pressure resistant heating device, which is heated under pressure such that material in the tape layers melt together and become cross-linked without the creation of voids.

SUMMARY

The tape comprises peroxide to facilitate the crosslinking process. It has been found by the present inventors that peroxide from the inner layer or layers of the tape may diffuse into the underlying inner semiconducting layer during crosslinking of the tape. This is because the inner semiconducting layer is essentially free of peroxide before the tape is wound around the inner semiconducting layer, typically because it has already been crosslinked. Due to the diffusion, the peroxide content in the inner layers of tape will have a lower peroxide content during the crosslinking process of the tape. The crosslinking of the inner tape layers may thus become less efficient.

A general object of the present disclosure is to provide a method of building a joint insulation of a power cable joint, which solves or at least mitigate problems of the prior art.

There is hence according to a first aspect of the present disclosure provided a method of building a joint insulation of a power cable joint comprising a conductor joint connecting a first conductor of a first cable length to a second conductor of second cable length, the method comprising: a) winding a first electrically insulating tape around an inner semiconducting layer that covers the conductor joint so that the first electrically insulating tape connects a first cable length insulation layer of the first cable length to a second cable length insulation layer of the second cable length, to form an inner insulation layer of the joint insulation, and b) winding a second electrically insulating tape around the inner insulation layer, so that the second electrically insulating tape connects the first cable length insulation layer to the second cable length insulation layer, to form an outer insulation layer of the joint insulation, wherein the first electrically insulating tape has a higher peroxide content than the second electrically insulating tape, and c) crosslinking the joint insulation.

It has been found by the present inventors that by using insulating tapes with different peroxide content to build the joint insulation, in particular with a higher peroxide content in an inner insulation layer than in an outer insulation layer of the joint insulation, the crosslinking process is improved. This is because due to the higher peroxide content, some of the peroxide is allowed to diffuse into the underlying inner semiconducting layer. The crosslinking of the inner insulation layer will still be effective because the remaining peroxide content is sufficient for the crosslinking process. The performance of the inner insulation layer and thus of the joint insulation will thus become improved especially mechanically but also electrically.

Furthermore, the adhesion of the inner insulation layer to the inner semiconducting layer will also improve because of crosslinking of the material at the interface or boundary between the inner semiconducting layer and the inner insulation layer.

Although the peroxide content initially differs in the two tape layers, the joint insulation will be homogenous after crosslinking, degassing, and equalisation of the power cable joint has been performed.

The power cable joint may be a factory joint or a flexible installation joint.

Both the first electrically insulating tape and the second electrically insulating tape have a peroxide content.

The peroxide may for example be di-cumyl peroxide, 2.2-di.tert.butyl peroxy butane, or tert.butyl cumyl peroxide.

The crosslinking in step b) may involve heating the joint insulation.

The crosslinking in step b) may be performed under pressure. The pressure may for example be in the range of 3-8 bar, such as 4-7 bar.

According to one embodiment the peroxide content of the first electrically insulating tape is 2 to 4 times higher than the peroxide content in the second electrically insulating tape.

According to one example the first electrically insulating tape may have a peroxide content of at most 3 wt %.

The inner insulation layer may be formed of a plurality of layers of the first electrically insulating tape. Thus, in step a) the first electrically insulating tape may be wound in a plurality of layers around the inner semiconducting layer.

The outer insulation layer may be formed of a plurality of layers of the second electrically insulating tape. Thus, in step b) the second electrically insulating tape may be wound in a plurality of layers around the inner insulation layer.

A layer of the first electrically insulating tape is formed by winding the first electrically insulating tape from one of the first cable length insulation layer and the second cable length insulation layer to the other one of the first cable length insulation layer and the second cable length insulation layer so that the taping completely covers the underlying surface. The first electrically insulating tape may or may not have been wound with overlaps when forming a layer.

A layer of the second electrically insulating tape is formed by winding the second electrically insulating tape from one of the first cable length insulation layer and the second cable length insulation layer to the other one of the first cable length insulation layer and the second cable length insulation layer so that the taping completely covers the underlying surface. The second electrically insulating tape may or may not have been wound with overlaps when forming a layer.

According to one embodiment step b) involves winding the second electrically insulating tape in more layers than the total number of layers of the first electrically insulating tape wound in step a). The number of layers of the first electrically insulating tape of the inner insulation layer is thus less than the number of layers of the second electrically insulating tape of the outer insulation layer.

For example, the number of layers of the first electrically insulating tape may be less than 10, such as less than 5, and the number of layers of the second electrically insulating tape may be more than 10, such as more than 20, such as more than 30, for example more than 40, 60, or 70.

According to one embodiment when step b) has been completed and prior to step c), the inner insulation layer and the outer insulation layer constitute the joint insulation and the volume of the inner insulation layer forms at most 10% of the total volume of the joint insulation, such as at most 7%, such as at most 5%, of the total volume of the joint insulation. The outer insulation layer is thus thicker than the inner insulation layer.

According to one embodiment the first electrically insulating tape and the second electrically insulating tape comprises a thermosetting polymer.

According to one embodiment the thermosetting polymer is polyethylene or ethylene propylene diene monomer rubber.

According to one embodiment prior to step a) the first cable length insulation layer and the second cable length insulation layer taper towards the conductor joint. The first cable length insulation layer and the second cable length insulation layer may thus be pencilled.

According to one embodiment the inner insulation layer comprises at least two layers of the first electrically insulating tape.

According to one embodiment the winding in step a) involves winding the first electrically insulating tape overlappingly. The first electrically insulating tape is thus wound such that adjacent turns of a layer in the axial direction overlap. The overlap may for example be at least 10%, such as at least 20%, such as in a range of 30-50%, of the width of the first electrically insulating tape.

According to one embodiment the winding in step b) involves winding the second electrically insulating tape overlappingly. The second electrically insulating tape is thus wound such that adjacent turns of a layer in the axial direction overlap. The overlap may for example be at least 10%, such as at least 20%, such as in a range of 30-50%, of the width of the second electrically insulating tape.

According to one embodiment in step a) the winding involves winding the first electrically insulating tape starting at the first cable length insulation layer and all the way to the second cable length insulation layer. For each subsequent layer, the first electrically insulating tape may be wound from the one of the first cable length insulation layer and the second cable length insulation layer at which the winding of the current layer ended back to the other one of the first cable length insulation layer and the second cable length insulation layer. For example, in a second layer of the first electrically insulating tape, the first electrically insulating tape is wound back from the second cable length insulation layer to the first cable length insulation layer. Alternatively, each subsequent layer may always be wound starting at only one of the first cable length insulation layer and the second cable length insulation layer.

According to one embodiment after step b) the joint insulation is thicker than a thickness of each of the first cable length insulation layer and the second cable length insulation layer.

There is according to a second aspect of the present disclosure provided a power cable comprising a power cable joint obtainable by the method according to the first aspect.

Generally, all terms used in the claims are to be interpreted according to their ordinary meaning in the technical field, unless explicitly defined otherwise herein. All references to a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
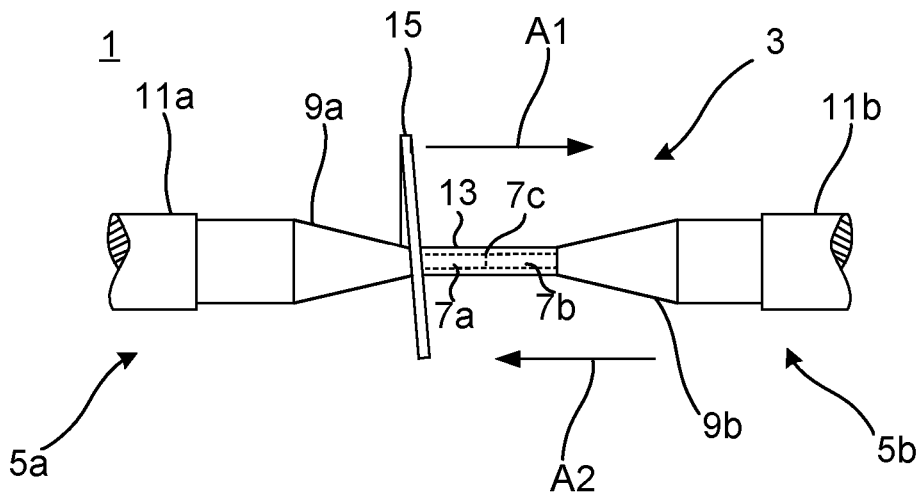
FIG. 1 schematically shows a side view of a power cable during an initial phase of building a joint insulation.

FIG. 1 schematically shows an example of a power cable joint 3 of a power cable 1 when the power cable joint 3 is being made.

In the process of making the power cable joint 3, a first cable length 5a and a second cable length 5b which are to be jointed to form the power cable 1 are provided.

The first cable length 5a comprises a first conductor 7a and the second cable length 5b comprises a second conductor 7b.

The first cable length 5a comprises an insulation system that surrounds the first conductor 7a. The insulation system of the first cable length 5a comprises an inner semiconducting layer, a first cable length insulation layer 9a arranged radially outside the inner semiconducting layer and an outer semiconducting layer 11a arranged radially outside the first cable length insulation layer 9a.

The second cable length 5b comprises an insulation system that surrounds the second conductor 7b. The insulation system of the second cable length 5b comprises an inner semiconducting layer, a second cable length insulation layer 9b arranged radially outside the inner semiconducting layer and an outer semiconducting layer 11b arranged radially outside the second cable length insulation layer 9b.

Typically, the insulation system of each of the first cable length 5a and the second cable length 5b is an extruded insulation system. The insulation system of each of the first cable length 5a and the second cable length 5b may for example be triple extruded, with all three aforementioned layers being extruded simultaneously over a respective one of the first conductor 7a and the second conductor 7b.

In the process of making the power cable joint 3, the first conductor 7a of the first cable length 5a is exposed at one end of the first cable length 5a and the second conductor 7b of the second cable length 5b is exposed at one end of the second cable length 5b. All the layers covering the first conductor 7a and the second conductor 7b, including the insulation system, are thus removed. The first conductor 7a and the second conductor 7b are then jointed to form a conductor join 7c. The jointing of the conductors 7a, 7b may for example be by thermal joining such as by means of welding.

When the conductors 7a and 7b have been jointed, the first cable length insulation layer 9a and the second cable length insulation layer 9b may be pencilled at their facing ends where the conductors 7a, 7b have been jointed. The first cable length insulation layer 9a and the second cable length insulation layer 9b are thus arranged to taper towards the conductor joint 7c and towards each other.

After the pencilling procedure, a joint insulation system is built over the conductor joint 7c and the entire length of exposed first and second conductors 7a, 7b. The joint insulation system connects the insulation system of the first cable length 5a to the insulation system of the second cable length 5b such that the power cable 1 has a single continuous insulation system.

The joint insulation system includes an inner semiconducting layer 13. The inner semiconducting layer 13 may be provided by winding a semiconducting tape over the exposed first and second conductors 7a, 7b and the conductor joint 7c such that the inner semiconducting layer of the first cable length 5a is connected to the inner semiconducting layer of the second cable length 5b and the entire exposed section of first and second conductors 7a, 7b, including the conductor joint 7c, is covered.

The semiconducting tape may comprise a thermosetting polymer which for example may be a compound comprising polyethylene, peroxide, and conductive particles such as carbon black. The semiconducting tape may alternatively be a thermoplastic polymer such as polypropylene.

In the next step, in case the semiconducting tape comprises a thermosetting polymer, the inner semiconducting layer 13 may be crosslinked in a pressure resistant heating device (not shown). The inner semiconducting layer 13 may be subjected to heating from a heat source arranged radially outside the inner semiconducting layer 13 to perform the crosslinking. The inner semiconducting layer 13 may additionally be subjected to inner heating by heating the first and second conductors 7a, 7b by means of induction, for example by means of high frequency coils arranged around the conductors 7a, 7b.

The pressure resistant heating device may be configured to subject the inner semiconducting layer 13 to a pressure in the range of 3-7 bar during the heating to eliminate the risk of creation of voids as the semiconducting tape is melted and crosslinked.

Figure 2:
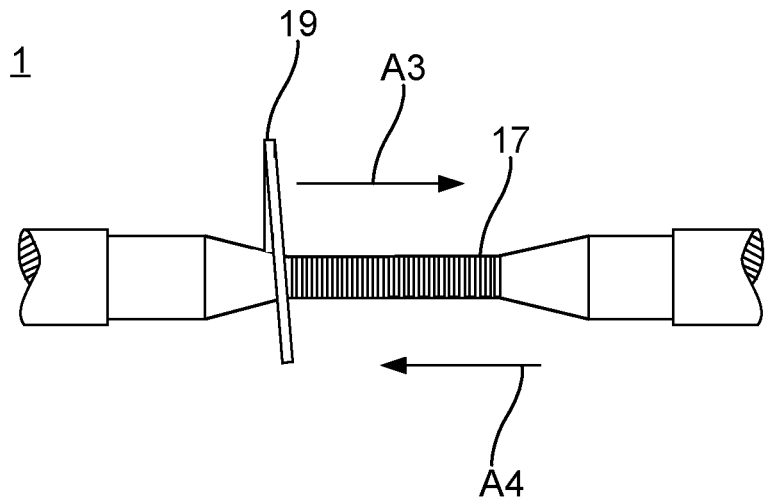
FIG. 2 schematically shows the power cable at a later stage than in FIG. 1 when the joint insulation is being built.
Figure 3:
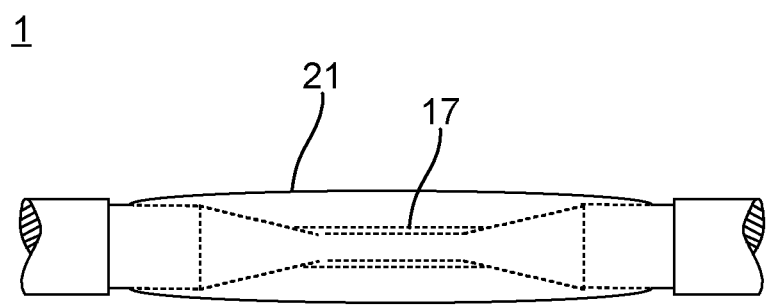
FIG. 3 schematically shows the power cable when the joint insulation has been built but prior to crosslinking.
Figure 4:
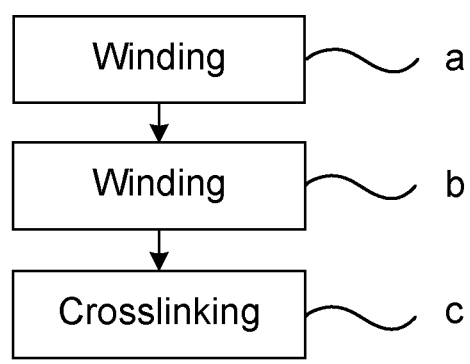
FIG. 4 is a flowchart of a method of building a joint insulation of a power cable joint.

After the inner semiconducting layer 13 has been provided around the exposed conductors 7a, 7b, and the conductor joint 7c, the joint insulation is built around the inner semiconducting layer 13 in steps a)-c), as shown in the flowchart in FIG. 4 and schematically in FIGS. 1-3.

In step a) a first electrically insulating tape 15 is wound around the inner semiconducting layer 13. The first electrically insulating tape 15 is wound starting at one of the first cable length insulation layer 9a and the second cable length insulation layer 9b. In the present example, the first electrically insulating tape 15 is wound starting from the first cable length insulation layer 9a. The winding of the first electrically insulating tape 15 may start over the pencilled portion of the first cable length insulation layer 9a. The first electrically insulating tape 15 is wound all the way to the second cable length insulation layer 9b, as schematically shown by the arrow A1. The first electrically insulating tape 15 may be wound onto the pencilled portion of the second cable length insulation layer 9b. The first layer of first electrically insulating tape 15 thus covers the inner semiconducting layer 13 and connects the first cable length insulation layer 9a to the second cable length insulation layer 9b.

The first electrically insulating tape 15 is preferably wound such that adjacent turns in the axial direction overlap. This overlap may for example be at least 10% of the width of the first electrically insulating tape 15.

The first electrically insulating tape 15 may then be wound all the way back from the second cable length insulation layer 9b to the first cable length insulation layer 9a to obtain a second layer of the first electrically insulating tape 15 over the inner semiconducting layer 13, as shown by arrow A2.

For each additional layer, the first electrically insulating tape 15 is wound further up on the pencilled surface of the first cable length insulation layer 9a and the second cable length insulation layer 9b.

The first electrically insulating tape 15 wound around the inner semiconducting layer 13 forms an inner insulation layer 17 of the joint insulation, as shown in FIG. 2.

In a step b) following step a), a second electrically insulating tape 19 is wound around the inner insulation layer 17. The second electrically insulating tape 19 is wound starting at one of the first cable length insulation layer 9a and the second cable length insulation layer 9b. In the present example, the second electrically insulating tape 19 is wound starting from the first cable length insulation layer 9a. The winding of the second electrically insulating tape 19 may start over the pencilled portion of the first cable length insulation layer 9a. The second electrically insulating tape 19 is wound all the way to the second cable length insulation layer 9b as schematically shown by the arrow A3. The second electrically insulating tape 19 may be wound onto the pencilled portion of the second cable length insulation layer 9b. The first layer of second electrically insulating tape 19 thus connects the first cable length insulation layer 9a to the second cable length insulation layer 9b and is arranged over the inner insulation layer 17 formed by the first electrically insulating tape 15.

Winding of the second electrically insulating tape 19 may for example start around the one of the first cable length insulation layer 9a and the second cable length insulation layer 9b at which the winding of the first electrically insulating tape 15 was completed.

The second electrically insulating tape 19 is preferably wound such that adjacent turns in the axial direction overlap. This overlap may for example be at least 10% of the width of the second electrically insulating tape 19.

The second electrically insulating tape 19 is then wound all the way back from the second cable length insulation layer 9b to the first cable length insulation layer 9a to obtain a second layer of the second electrically insulating tape 19 over the inner insulation layer 17, as shown by arrow A4. Alternatively, instead of winding back and forth, the second electrically insulating tape 19 may be wound starting for each layer always at the same side of the conductor joint 7c, i.e., always around the first cable length insulation layer 9a or the second cable length insulation layer 9b.

For each layer additional to the first layer, the second electrically insulating tape 19 is wound further up on the pencilled surfaces. The second electrically insulating tape 19 is wound back and forth between the first cable length insulation layer 9a and the second cable length insulation layer 9b until it completely covers the pencilled surfaces of the first cable length insulation layer 9a and the second cable length insulation layer 9b, as shown in FIG. 3.

The layers of second electrically insulating tape 19 wound around the inner insulation layer 17 forms an outer insulation layer 21 of the joint insulation.

The joint insulation, which is formed by the inner insulation layer 17 and the outer insulation layer 21, is thicker than the radial thickness of each of the first cable length insulation layer 9a and the second cable length insulation layer 9b.

The joint insulation has substantially more layers of the second electrically insulating tape 19 than of the first electrically insulating tape 15. The first electrically insulating tape may for example be wound with 10 layers or less, such as 5 layers or less, for example 2 or 3 layers, to form the inner insulation layer. The second electrically insulating tape may for example be wound with more than 10 layers, such as 20-30 layers, or 40-50 layers, or 50-60 layers, or 60-70 layers, or more than 70 layers, to form the outer insulation layer.

The volume of the inner insulation layer may for example be at most 10%, such as at most 7%, such as at most 5%, of the total volume of the joint insulation, i.e., the volume formed by the volumes of the inner insulation layer and the outer insulation layer, after step a) has been completed and prior to step b) described in the following.

According to one example, after step b) an axial gap is left between the outer semiconducting layer 11a of the first cable length 5a and the outer insulation layer 21, as shown in FIG. 3. According to one example, after step b) an axial gap is left between the outer semiconducting layer 11b of the second cable length 5b and the outer insulation layer 21.

The first electrically insulating tape 15 may comprise a thermosetting polymer, such as polyethylene or ethylene propylene diene monomer (EPDM) rubber. The second electrically insulating tape 19 may comprise a thermosetting polymer, such as polyethylene or EPDM rubber.

Each of the first electrically insulating tape 15 and the second electrically insulating tape 19 comprises peroxide such as dicumyl peroxide. The first electrically insulating tape 15 has a higher peroxide content than the second electrically insulating tape 19. The first electrically insulating tape 15 may for example have a peroxide content that is 2-4 times higher than the peroxide content of the second electrically insulating tape 19.

Before step a) the outer surface of the inner semiconducting layer 13 is processed mechanically to obtain a smooth surface. If the inner semiconducting layer 13 has been crosslinked, the mechanical processing is performed after the crosslinking.

In a step c) the joint insulation formed by the inner insulation layer 17 and the outer insulation layer 21 is crosslinked.

The crosslinking in step c) may involve heating the joint insulation in the pressure resistant heating device under pressure. The pressure may for example be in the range of 3-8 bar, such as 4-7 bar.

After the crosslinking, the joint insulation may be processed mechanically so that it obtains an even and smooth outer surface.

After the joint insulation has been mechanically processed, an outer semiconducting layer is provided around the joint insulation such that the outer semiconducting layer connects to the outer semiconducting layers 11a and 11b of the respective one of the first and second cable lengths 5a and 5b. The outer semiconducting layer is then crosslinked in the pressure resistant heating device under pressure. The joint insulation system of the power cable joint 3 is thus completed.

It is to be noted that the first electrically insulating tape 15 has a higher peroxide content than the second electrically insulating tape 19 before step c). After step c), the first electrically insulating tape 15 and the second electrically insulating tape 19 have melted together and are crosslinked. The power cable 1, including the power cable joint 3, may after the completion of the power cable joint 3 be subjected to a degassing procedure and to equalisation, after which the distribution of components in the joint insulation is homogeneous.

Further steps in the jointing procedure may for example comprise connecting a water barrier of each of the first cable length 5a and the second cable length 5b to a water barrier provided over the outer semiconducting layer of the joint insulation system and providing a polymeric sheath around the joint insulation system or around the water barrier if a water barrier is present.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of building a joint insulation of a power cable joint comprising a conductor joint connecting a first conductor of a first cable length to a second conductor of a second cable length, the method comprising:
   a) winding a first electrically insulating tape around an inner semiconducting layer that covers the conductor joint so that the first electrically insulating tape connects a first cable length insulation layer of the first cable length to a second cable length insulation layer of the second cable length, to form an inner insulation layer of the joint insulation, and
   b) winding a second electrically insulating tape around the inner insulation layer, so that the second electrically insulating tape connects the first cable length insulation layer to the second cable length insulation layer, to form an outer insulation layer of the joint insulation, wherein the first electrically insulating tape has a higher peroxide content than the second electrically insulating tape, and
   c) crosslinking the joint insulation.

2. The method as claimed in claim 1, wherein the peroxide content of the first electrically insulating tape is 2 to 4 times higher than the peroxide content in the second electrically insulating tape.

3. The method as claimed in claim 1, wherein step b) involves winding the second electrically insulating tape in more layers than the total number of layers of the first electrically insulating tape wound in step a).

4. The method as claimed in claim 1, wherein when step b) has been completed and prior to step c), the inner insulation layer and the outer insulation layer constitute the joint insulation and the volume of the inner insulation layer forms at most 10% of the total volume of the joint insulation.

5. The method as claimed in claim 1, wherein the first electrically insulating tape and the second electrically insulating tape includes a thermosetting polymer.

6. The method as claimed in claim 5, wherein the thermosetting polymer is polyethylene or ethylene propylene diene monomer rubber.

7. The method as claimed in claim 1, wherein prior to step a) the first cable length insulation layer and the second cable length insulation layer taper towards the conductor joint.

8. The method as claimed in claim 1, wherein the inner insulation layer comprises at least two layers of the first electrically insulating tape.

9. The method as claimed in claim 1, wherein the winding in step a) involves winding the first electrically insulating tape overlappingly.

10. The method as claimed in claim 1, wherein the winding in step b) involves winding the second electrically insulating tape overlappingly.

11. The method as claimed in claim 1, wherein in step a) the winding involves winding the first electrically insulating tape starting at the first cable length insulation layer and all the way to the second cable length insulation layer.

12. The method as claimed in claim 1, wherein after step b) the joint insulation is thicker than a thickness of each of the first cable length insulation layer and the second cable length insulation layer.

13. The method as claimed in claim 1, wherein step a) comprises:
    winding the first electrically insulating tape around the inner semiconducting layer from the first cable length insulation layer to the second cable length insulation layer; and
    winding the first electrically insulating tape back from the second cable length insulation layer to the first electrically insulating tape to obtain a second layer of the first electrically insulating tape over the inner semiconducting layer.

14. The method as claimed in claim 1, wherein step b) comprises:
    winding the second electrically insulating tape around the inner semiconducting layer from the first cable length insulation layer to the second cable length insulation layer; and
    winding the second electrically insulating tape back from the second cable length insulation layer to the first electrically insulating tape to obtain a second layer of the second electrically insulating tape over the inner insulation layer.

15. The method as claimed in claim 1, further comprising:
    after step b), providing an axial gap between an outer semiconducting layer of the first cable length and the outer insulation layer, the outer semiconducting layer of the first cable length being arranged radially outside of the first cable length insulation layer; and/or
    after step b), providing an axial gap between an outer semiconducting layer of the second cable length and the outer insulation layer, the outer semiconducting layer of the second cable length being arranged radially outside of the second cable length insulation layer.

* * * * *